July 17, 1934.　　　　P. DOPP　　　　1,966,544

ENDLESS TRACK VEHICLE

Filed Feb. 27, 1930

P. Dopp
INVENTOR

By Marks & Clerk
ATTYS.

Patented July 17, 1934

1,966,544

UNITED STATES PATENT OFFICE 1,966,544

ENDLESS TRACK VEHICLE

Paul Dopp, Lubeck, Germany, assignor to Lübecker Maschinenbau-Gesellschaft, Lubeck, Germany Application February 27, 1930, Serial No. 431,934
In Germany March 4, 1929

2 Claims. (Cl. 180—9.1)

This invention relates to means for connecting the undercarriage of endless track vehicles with the guiding frame of the endless tracks, and consists in this, that the driving shaft of the endless tracks is guided in a manner known per se, through the spherical centre bearing which acts as a connection between the body and the guiding frame of the endless tracks.

This provides a satisfactory transmission of the driving power from the body of the vehicle to the guiding frames of the endless tracks, which are in general movable with respect to it, this being of special importance in self-propelling vehicles. In the case of vehicles which receive their driving power from a stationary source of power, the transforming machines, for instance the electric motor, can be housed at a place which is protected from external influences, preferably in the body of the vehicle.

Figure 1:
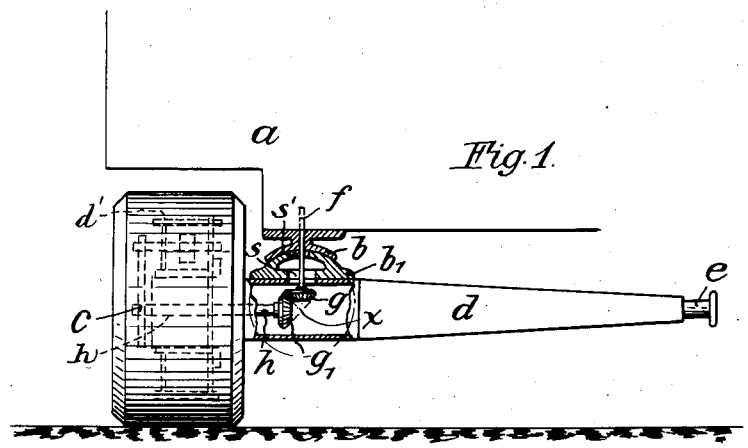
Figure 1 is a front elevation, partly in section of the device.

The arrangement according to Figure 1 shows the combination of the supporting, steering and driving means of the single endless track of a vehicle in front elevation with the driving and supporting means in section. The vehicle body $a$ is supported in a known manner by means of a spherical centre bearing $b$, $b^1$ on the steering arm $d$ which is secured to the endless track guiding frame $d'$ of the endless track $c$ and with the free end $e$ of which the steering rod engages. The usual track chain is supported by the track guiding frame $d'$ in the customary manner. The shaft $f$ driven by the source of power carried in the body of the vehicle is guided in a manner known per se by the spherical pivot $b$, $b^1$ and transmits the rotation, in a manner known per se, through a pair of bevel wheels $g$, $g^1$ to the driving shaft $h$ of the endless track $c$.

The endless track $c$ its mounting and driving mechanism are of the conventional type, the track being carried by the guiding frame $d'$, indicated by dotted lines in Fig. 1. Integral with the guiding frame is the tubular steering arm $d$ and extending into the frame is the shaft $h$ for driving the endless track, the shaft being in alinement with the horizontal axis of the guiding frame. As the guiding frame oscillates the tubular arm $d$ oscillates with it.

According to the arrangement, the spaced relation of the tubular steering arm $d$ to the bottom of the vehicle body $a$ is maintained so that the arm moves in a generally horizontal direction about the shaft $f$ during a steering operation. As the endless track $c$ travels over a rough roadway, there is more or less vertical oscillation of the guiding frame $d'$, which is imparted to the arm $d$, as the latter is integral with the guiding frame. The spherical bearings $b$ and $b'$, interposed between the arm and the bottom of the body part $a$, accommodate the relative movement between the arm and the body part. To meet the requirement of this relative movement the arrangement of the bevel gears $g$ and $g'$, with relation to the spherical bearings $b$ and $b'$, is such that the conical apex of the gears coincides with the center $x$ of the spherical curvature of the mutually contacting surfaces of the members $b$ and $b'$, as indicated by dotted lines in Fig. 1. To accommodate the oscillation of the steering arm $d$ with relation to the driving shaft $f$, the said arm and the base of the convex bearing member $b'$ have coincident openings $s$ through which passes the shaft $f$. These openings are of such size as to permit free play of the shaft therein during the vertical and horizontal oscillations of the steering arm. In the crown of the convex bearing member $b'$ is the smaller opening $s'$ to permit the more limited play of the shaft passing therethrough.

Figure 2:
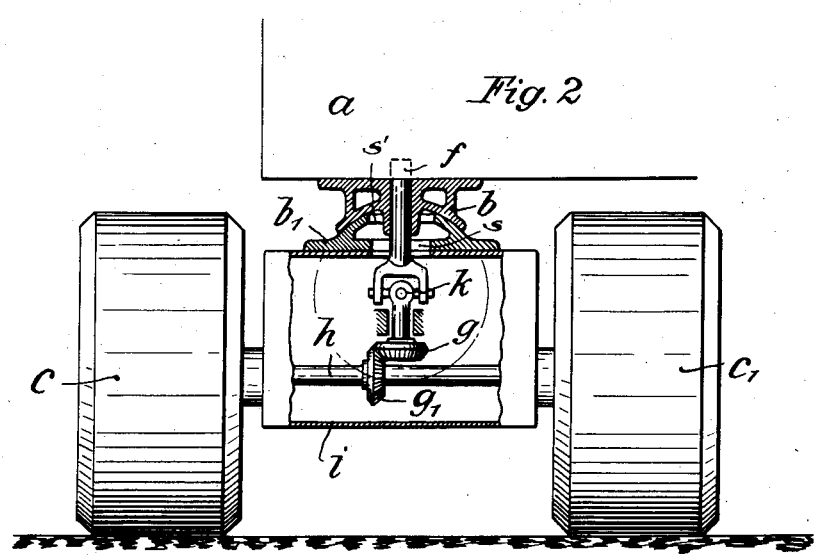
Figure 2 is a similar view of a modified form of the invention.

In Figure 2 an endless track bogie having for instance two endless tracks is illustrated in front elevation. The body $a$ of the vehicle is supported in a known manner by means of a spherical centre bearing $b$, $b'$ on the frame $i$ connecting the two endless tracks $c$, $c^1$. The shaft $f$ driven by the source of power carried in the body $a$ of the vehicle passes in a known manner through the spherical centre pivot $b$, $b'$, and transmits the rotation in a manner known per se through a Cardan joint $k$ and a pair of bevel wheels $g$, $g^1$ on the driving shaft $h$ of the endless tracks $c$, $c^1$. According to this arrangement, a further movement in a vertical plane about a shaft lying in the direction of travel must be maintained between the vehicle body $a$ and the guiding frame $i$ of the track chain. This requirement is obtained by arranging the Cardan joint $k$ in the center of the spherical pivot $b$, $b'$ receiving the rod.

What I claim is:

1. The combination of a vehicle body part and an endless track carrier therefor having a tubular steering arm projecting from its inner side, with a spherical bearing interposed between the body part and the steering arm, said bearing comprising interfitting concave and convex members respectively secured to the under side of the body part and on the upper side of the steering arm, a driving shaft journaled radially in the center of the concave member and extending through the convex member into the tubular steering arm, said convex member and said steering arm having enlarged registering openings for the passage of the driving shaft therethrough and to permit oscillative movement of the convex member and steering arm relatively to said driving shaft, a driven shaft horizontally mounted in the track carrier and extending into the steering arm, and gearing transmitting the drive from the driving shaft to the driven shaft.

2. The combination of a vehicle body part and an endless track carrier therefor including a tubular housing mounted on the inner side of the carrier, with a spherical bearing interposed between the body part and the housing, said bearing comprising interfitting concave and convex members with one of said members secured to the under side of the body part and the other member secured on the housing, a driving shaft journaled radially in the center of the upper spherical member and extending through the radial center of the lower spherical member into the housing, said lower spherical member and the adjacent part of the housing having registering openings therethrough for the passage of the driving shaft, said registering openings being sufficiently large to permit movement of the housing and lower spherical member relatively to the driving shaft, a driven shaft mounted in the track carrier and extending into the housing, and gearing to transmit the motion of the drive shaft to the driven shaft.

PAUL DOPP.